United States Patent [19]
Hoover

[11] Patent Number: 5,563,574
[45] Date of Patent: Oct. 8, 1996

[54] ELECTRONIC SOUND PRODUCING GAME ANIMAL DISTRACTION DEVICE FOR USE BY A HUNTER

[76] Inventor: Dustin A. Hoover, 737 Dogwood Rd., Annapolis, Md. 21401

[21] Appl. No.: 452,984

[22] Filed: May 30, 1995

[51] Int. Cl.⁶ ....................................... G08B 3/00
[52] U.S. Cl. .................... 340/384.7; 340/384.4; 340/404.1; 340/404.2
[58] Field of Search ............... 340/384.7, 384.3, 340/384.4, 384.5, 404.1, 404.2, 404.3, 384.6

[56] References Cited

U.S. PATENT DOCUMENTS

| | | | |
|---|---|---|---|
| 3,618,059 | 11/1971 | Allen | 340/539 |
| 4,411,020 | 3/1981 | Imazeki et al. | 455/219 |
| 4,862,625 | 11/1988 | Dolan | 43/1 |
| 5,170,172 | 11/1991 | Weinstein | 342/458 |
| 5,402,102 | 4/1993 | Lachance | 340/404.1 |

*Primary Examiner*—Jeffery Hofsass
*Assistant Examiner*—Davetta C. Woods

[57] ABSTRACT

An electronic sound producing device for use by a hunter including a transmitter mechanism for generating and transmitting into free space one of a plurality of radio signals and with the radio signal selectable by the hunter; a coupling mechanism for securing the transmitter mechanism to a bow handle or a stock of a rifle; and a remotely positionable receiver mechanism for receiving the selected radio frequency signal and producing an audible sound with a pitch indicative of such signal.

3 Claims, 4 Drawing Sheets

5,563,574

ELECTRONIC SOUND PRODUCING GAME ANIMAL DISTRACTION DEVICE FOR USE BY A HUNTER

BACKGROUND OF THE INVENTION

1. Field of the Invention

The present invention relates to an electronic sound producing game animal distraction device for use by a hunter and more particularly pertains to distracting a game animal being stalked by a hunter and thus allowing the hunter to draw his weapon without being seen by the distracted animal with an electronic sound producing game animal distraction device.

2. Description of the Prior Art

The use of decoys and the like is known in the prior art. More specifically, decoys and the like heretofore devised and utilized for the purpose of distracting game animals are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,773,178 to Marek discloses a deer decoy. U.S. Pat. No. 4,967,684 to Vidovic et al. discloses a warning device. U.S. Pat. No. 5,073,139 to Kassarich discloses a noise-maker. U.S. Pat. No. 5,183,951 to Bilodeau discloses weaponry signal apparatus. U.S. Pat. No. 5,239,587 to Muckelrath discloses a sound recording device for use by hunters. U.S. Pat. No. 5,302,938 to Martineau discloses a sound generating device for a firearm, bow or the like.

While these devices fulfill their respective, particular objective and requirements, the aforementioned patents do not describe an electronic sound producing game animal distraction device for use by a hunter that produces sound that readily distracts game animals being stalked and includes a transmitter securable to a bow or a rifle and a spherical transmitter that can be set or thrown by a hunter into an area for use.

In this respect, the electronic sound producing game animal distraction device for use by a hunter according to the present invention substantially departs from the conventional concepts and designs of the prior art, and in doing so provides an apparatus primarily developed for the purpose of distracting a game animal being stalked and thus allowing the hunter to draw his weapon without being seen by the distracted animal.

Therefore, it can be appreciated that there exists a continuing need for new and improved electronic sound producing game animal distraction device for use by a hunter which can be used for distracting a game animal being stalked and thus allowing the hunter to draw his weapon without being seen by the distracted animal. In this regard, the present invention substantially fulfills this need.

SUMMARY OF THE INVENTION

In the view of the foregoing disadvantages inherent in the known types of decoys and the like now present in the prior art, the present invention provides an improved electronic sound producing game animal distraction device for use by a hunter. As such, the general purpose of the present invention, which will be described subsequently in greater detail, is to provide a new and improved electronic sound producing game animal distraction device for use by a hunter and method which has all the advantages of the prior art and none of the disadvantages.

To attain this, the present invention essentially comprises, in combination, a transmitter apparatus. The transmitter apparatus includes a hollow rigid plastic box-shaped housing having a top wall, a bottom wall, and a periphery interconnecting the top wall and the bottom wall formed of a pair of opposed long side walls and a pair of short side walls. The transmitter apparatus includes a first pair of flexible straps and a second pair of flexible straps. The first pair of straps is coupled to the bottom wall of the housing and extended outwards therefrom in opposite directions that are perpendicular to the long side walls. The second pair of flexible straps is coupled to the bottom wall of the housing and extended outwards therefrom in opposite directions that are perpendicular to the short side walls. One strap of the first pair has a pile-type fastener coupled thereto, and one strap of the second pair has a pile-type fastener coupled thereto. The other strap of the first pair has a complementary pile-type fastener coupled thereto, and the other strap of the second pair has a complementary pile-type fastener coupled thereto. The fasteners of the first pair are securable in a closed loop configuration, and the fasteners of the second pair securable in another closed loop configuration. Both straps are used to secure the housing to a bow handle or a stock of a rifle with the fasteners in the closed loop orientations.

In addition, the transmitter apparatus includes an electronic transmitter circuit disposed within the housing. The transmitter circuit includes an oscillator means for generating a plurality of radio signals over a predetermined frequency range, amplification means coupled to the oscillator means for amplifying the generated radio signals, manually-actuated frequency selection means coupled to the amplifier means and extended through the top wall of the housing for allowing the hunter to choose one of four radio signals at a selected frequency or frequencies for use, antenna means coupled to the frequency selection means and extended from the housing for allowing propagation of the chosen radio signal into free space, a removable battery for supplying electrical energy for operation, and a power switch coupled between the battery and the transmitter circuit and extended through the housing. The power switch of the transmitter apparatus has one orientation for allowing supply of electrical energy from the battery to the transmitter circuit and another orientation for preventing such supply.

Lastly, a receiver apparatus is provided. The receiver apparatus includes a rigid plastic spherical casing formed of two hemispheric sections of a blaze orange color coupled together to create a hollow interior and with the casing further having a strip of reflective material coupled thereto. In addition, the receiver apparatus includes four electronic receiver circuits disposed within the casing. The casing and receiver circuits therein are positionable at a location remote from the transmitter. Each receiver circuit further includes antenna means extended through a separate bore formed on the casing. The antenna means is tuned for receiving one of the four radio signals transmitted from the transmitter apparatus. Each receiver circuit additionally includes amplifier means coupled to the antenna for amplifying the received radio signal, speaker means coupled to the amplifier means and extended through a separate port on the casing and for producing an audible sound with a pitch indicative of the frequency or frequencies of the received radio signal, a removable battery for supplying electrical energy for operation, and a power switch coupled between the battery and the receiver circuits and extended through the housing. The power switch of the receiver apparatus has one orientation for allowing supply of electrical power and another orientation for preventing such supply.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electronic sound producing game animal distraction device for use by a hunter which has all the advantages of the prior art decoys and the like and none of the disadvantages.

It is another object of the present invention to provide a new and improved electronic sound producing game animal distraction device for use by a hunter which may be easily and efficiently manufactured and marketed.

It is a further object of the present invention to provide a new and improved electronic sound producing game animal distraction device for use by a hunter which is of durable and reliable construction.

An even further object of the present invention is to provide a new and improved electronic sound producing game animal distraction device for use by a hunter which is susceptible of a low cost of manufacture with regard to both materials and labor, and which accordingly is then susceptible of low prices of sale to the consuming public, thereby making such an electronic sound producing game animal distraction device for use by a hunter economically available to the buying public.

Still yet another object of the present invention is to provide a new and improved electronic sound producing game animal distraction device for use by a hunter which provides in the apparatuses and methods of the prior art some of the advantages thereof, while simultaneously overcoming some of the disadvantages normally associated therewith.

Even still another object of the present invention is to provide a new and improved electronic sound producing game animal distraction device for use by a hunter for distracting a game animal being stalked and thus allowing the hunter to draw his weapon without being seen by the distracted animal.

Lastly, it is an object of the present invention to provide a new and improved electronic sound producing game animal distraction device for use by a hunter comprising transmitter means for generating and transmitting into free space one of a plurality of radio signals and with the radio signal selectable by a hunter; coupling means for securing the transmitter means to a bow handle or a stock of a rifle; and remotely positionable receiver means for receiving the selected radio frequency signal and producing an audible sound with a pitch indicative of such signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
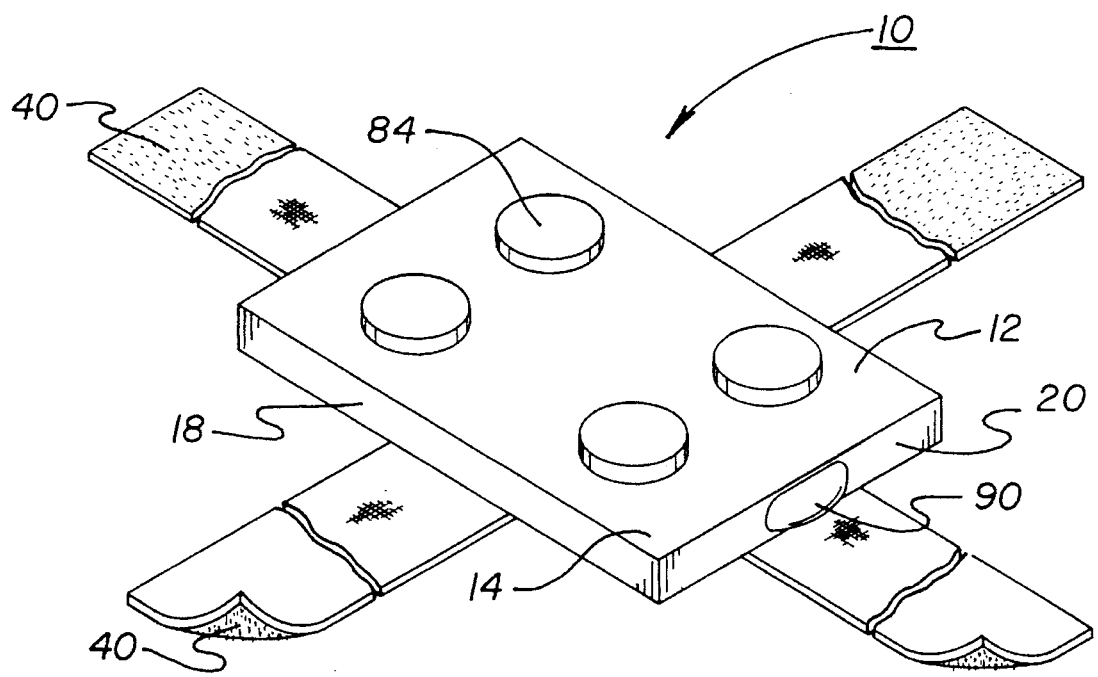
FIG. 1 is a perspective view of the transmitter apparatus of the present invention.
Figures 2, 3:
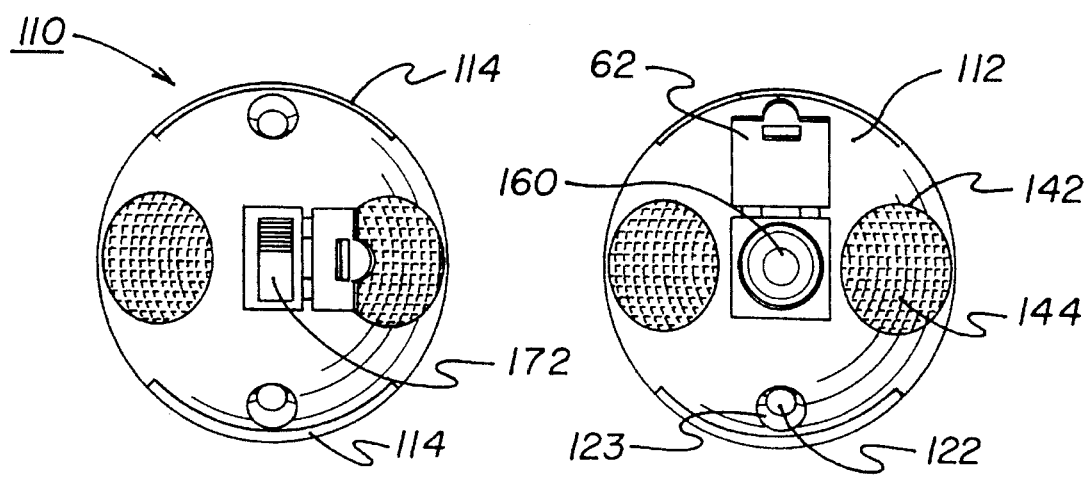
FIG. 2 is a top plan view of the receiver apparatus of the present invention.
FIG. 3 is a bottom plan view of the receiver apparatus of the present invention.
Figure 4:
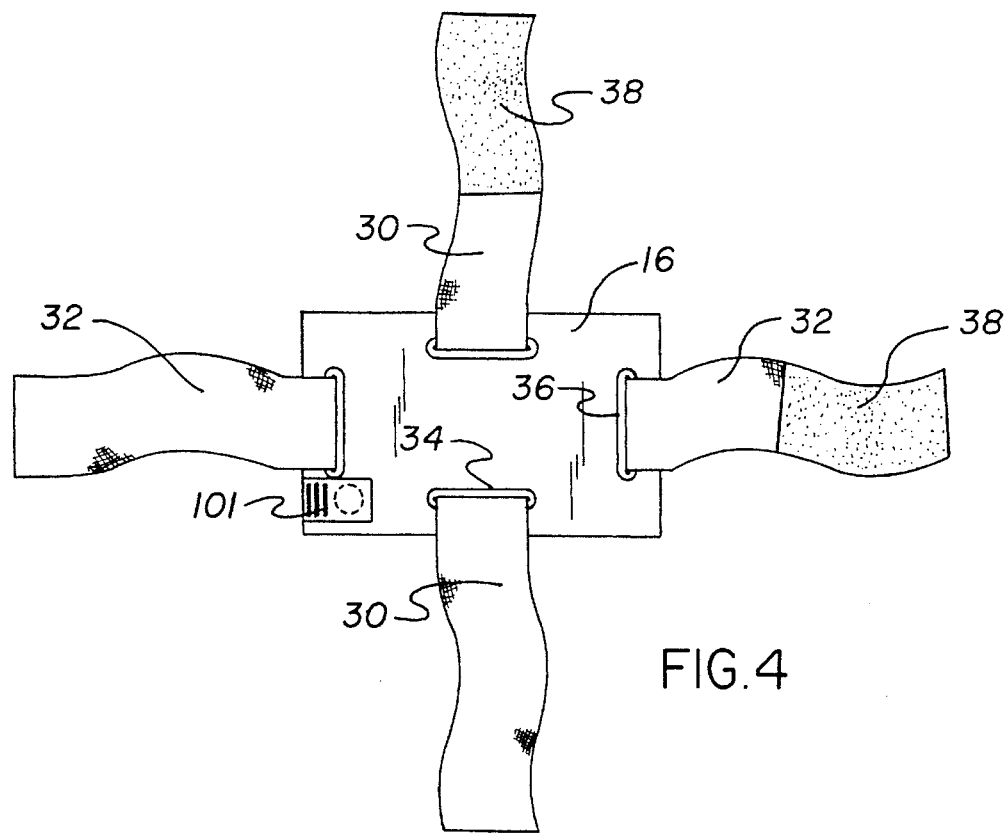
FIG. 4 is a bottom plan view of the transmitter apparatus of the present invention.
Figure 5:
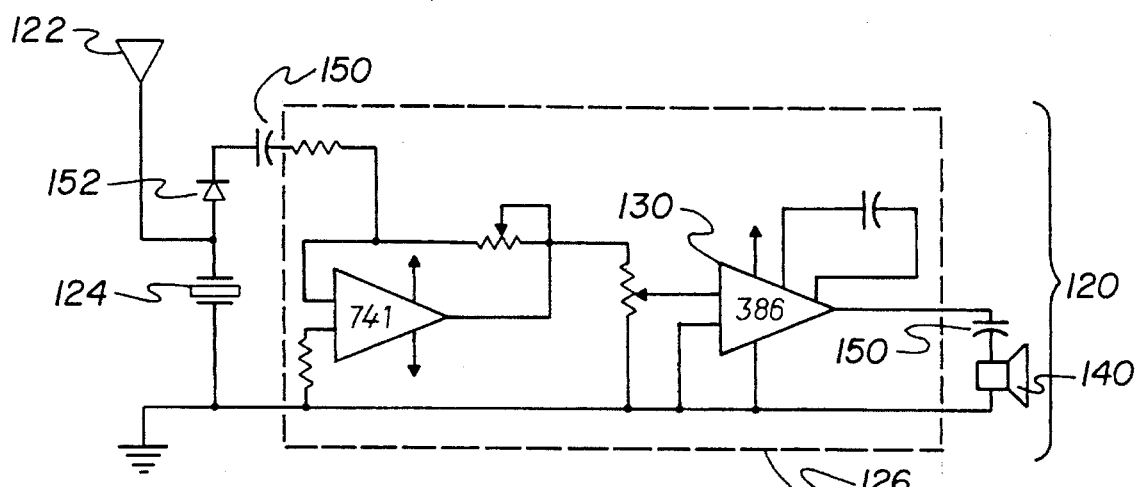
FIG. 5 is a schematic diagram of a receiver circuit of the receiver apparatus.
Figure 6:
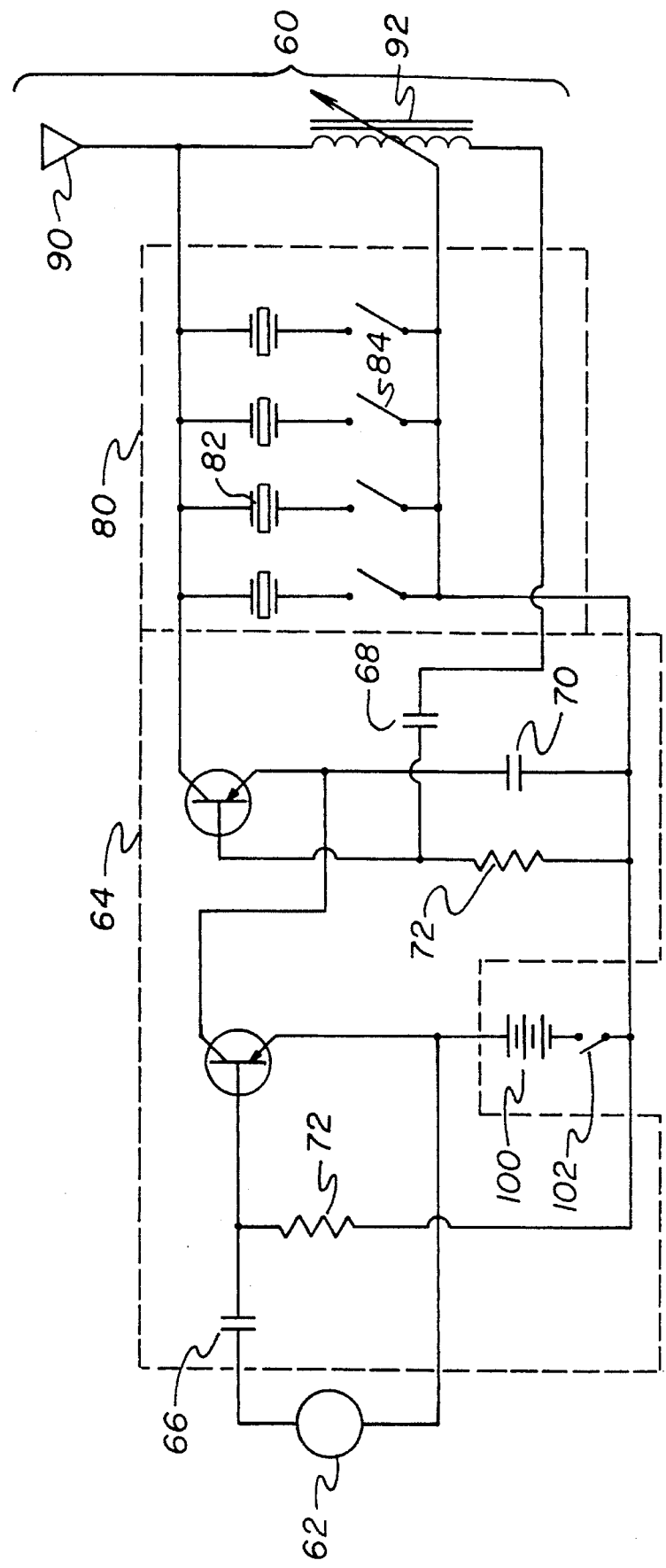
FIG. 6 is a schematic diagram of the transmitter circuit of the transmitter apparatus.
Figures 7, 8:
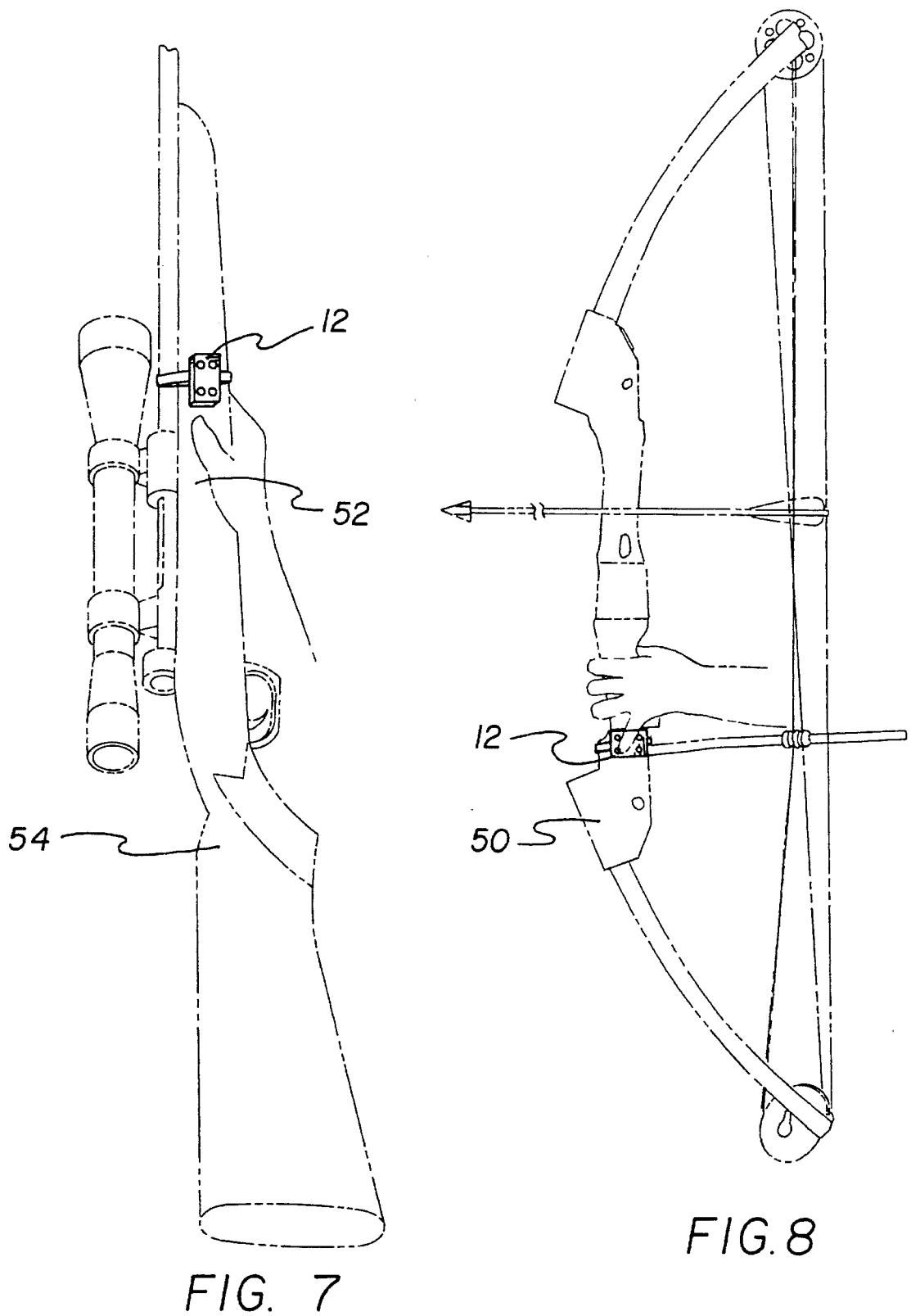
FIG. 7 is a view of the transmitter apparatus of the present invention secured to a handle of a bow for use by a hunter.
FIG. 8 is a view of the transmitter apparatus of the present invention secured to a stock of a rifle for use by a hunter.

With reference now to the drawings, and in particular, to FIG. 1 thereof, the preferred embodiment of the new and improved electronic sound producing game animal distraction device for use by a hunter embodying the principles and concepts of the present invention and generally designated by the reference number 10 will be described.

The preferred embodiment of the present invention comprises a plurality of components. In their broadest context, such components include a transmitter apparatus and a receiver apparatus. Such components are individually configured and correlated with respect to each other to provide a sound producing device that can be used by a hunter for distracting a game animal being stalked. Thus, the present invention allows the hunter to draw his weapon for firing at the distracted animal without being seen by the distracted animal.

Specifically, the present invention includes a transmitter apparatus 10. The transmitter apparatus includes a hollow box-shaped housing 12. The housing is formed of a rigid plastic. The housing 12 has a top wall 14, a bottom wall 16, and a periphery interconnecting the top wall and the bottom wall. The periphery is formed of a pair of opposed long side walls 18 and a pair of short side walls 20.

The transmitter apparatus also includes a first pair of flexible straps 30 and a second pair of flexible straps 32. The straps of the first and the second pair are formed of a nylon or other elastomeric material. The first pair of straps is secured to the bottom wall 16 of the housing and extended outwards therefrom through slot 34 in opposite directions, thereby placing the straps 30 in an orientation perpendicular to the long side walls 18. The second pair of flexible straps 32 are secured to the bottom wall 16 of the housing and extended outwards therefrom through slots 36 in opposite directions, thereby placing the straps 32 in an orientation perpendicular to the short side walls 20 and the straps 30. One strap 30 of the first pair has a strip of pile-type fastener 38 sewn thereto, and one strap 32 of the second pair has a strip of pile-type fastener 38 sewn thereto. The other strap 30 of the first pair has a strip of complimentary pile-type fastener 40 sewn thereto, and the other strap 32 of the second pair has a strip of complimentary pile-type fastener 40 coupled thereto. The fasteners 38, 40 of the first pair of straps 30 are securable in a closed loop configuration. The fasteners 38, 40 of the second pair of straps 32 are also securable in another closed loop configuration. In their closed loop orientations, the straps secure the housing 12 about a bow handle 50 or a stock 52 of a rifle 54.

Disposed within the housing 12 is an electronic transmitter circuit 60. The transmitter circuit includes an oscillator mechanism 62. The oscillator mechanism 62 is used for generating a plurality of radio signals over a predetermined frequency range. This frequency range would be set during manufacture of the present invention. Also included is an amplifier mechanism 64 coupled to the oscillator mechanism 62. The amplifier mechanism is used for amplifying the generated radio signals. The amplifier mechanism includes filtering capacitors 66, 68, and 70 for removing the DC component in the generated radio signal. Amplification is performed through an interconnected pair of NPN transistors. A pull-down resistor 72 is coupled to the base of each transistor to insure its proper biasing. A manually-activated frequency selection mechanism 80 is coupled to the amplifier mechanism 64. Radio signals with different frequencies are generated through selective actuation of one of four frequency-controlled crystals 82 of the frequency selection mechanism 80. Each crystal 82 is placed into operation through depression of a switch actuated via a depressible button 84 extended through the top wall 14 of the housing. The frequency selection mechanism thus allows the hunter to choose one of four radio signals at a selected frequency or frequencies for use. The transmitter circuit 60 also includes an antenna mechanism 90 controlled through coil 92. The antenna mechanism 90 and coil 92 are coupled to the frequency selection mechanism 80 and extended from one of the short side walls 20 of the housing. The antenna mechanism allows directional radiation of the chosen radio signal into free space. A removable battery 100 is provided for supplying electrical energy for operation. The battery is accessible through an access door 101 formed on the bottom wall 16 of the housing 12. Lastly, a power switch 102 is provided and coupled between the battery 100 and the transmitter circuit 60. The power switch has a toggleable portion extended through the housing. The power switch has one orientation for allowing supply of electrical energy from the battery to the transmitter circuit 60 and another orientation for preventing such supply.

In addition, a receiver apparatus 110 is included. The receiver apparatus has a spherical casing 112. The casing is formed of a rigid plastic. Two hemispheric sections are coupled together to create a hollow interior. The sections are of a blaze orange color but can also be formed to bear a camouflage-type pattern in another embodiment. The casing also includes several strips of reflective material 114 adhered thereto for facilitating the location of the casing 112 in conditions of reduced visibility. The casing of the receiver is of a size and weight that allows it to be thrown by a hunter to a remote location for use. To facilitate such throwing, the casing has a diameter that is no greater than about 5 inches.

Four electronic receiver circuits are disposed within the casing 112. The casing and receiver circuits therein are positionable at a location remote from the transmitter apparatus 10. Each receiver circuit is hardened to withstand jarring impacts upon striking the ground after being thrown by a hunter to a position for use. Each receiver circuit 120 includes an antenna mechanism 122. The antenna mechanism is extended through a separate bore 123 formed on the casing. Each bore is back fit with a grommet to preclude moisture from entering the casing. Each antenna mechanism is tuned with a frequency-control crystal for receiving one of the four radio signals with a corresponding frequency or frequencies transmitted from the transmitter apparatus 10. Each receiver circuit also includes an amplifier mechanism 124 coupled to the antenna mechanism. The amplifier mechanism is used for amplifying the received radio signal. The amplifier mechanism is formed of a basic inverting amplifier coupled to an audio amplifier. The basic inverting amplifier is formed of a conventional and commercially available general purpose 741 operational amplifier. The audio amplifier is formed of a commercially available 386 operational amplifier. In addition, a speaker mechanism 140 is coupled to the amplifier mechanism 124 of each receiver circuit. Each speaker mechanism is extended through a separate port 142 on the casing 112 and back fit with a seal to preclude moisture from entering the casing. The speaker mechanism is used for producing an audible sound with a pitch indicative of the frequency or frequencies of the received radio signal. Each speaker mechanism is covered with a grill 144 that is secured to the exterior of the casing to preclude such speaker mechanism from being damaged. In addition, each receiver circuit includes filter capacitors 150 for removing the unwanted DC power component. Diode 152 is coupled to the input of the amplifier mechanism 124 to prevent reverse current flow therethrough. A battery 160 is provided for supplying electrical energy for operation. The battery 160 is accessible through a door 162 that is hingably coupled to the casing 112. Lastly, a power switch 170 is included. The power switch is coupled between the battery and the receiver circuits. The power switch includes a toggleable portion 172 extended through the casing. The power switch has one orientation for allowing supply of electrical power to the receiver circuit and another orientation for preventing such supply.

The present invention is an electronic sound device used to distract wild game animals directly away from a hunter's position. By distracting the animal, the hunter has time to draw his weapon for firing at an animal being stalked from his position without being seen. Use of the present invention thereby lessens the chance of the animal spotting this hunter and fleeing before an accurate shot can be fired. The present invention is to be used primarily by bow and arrow hunters but can be used by hunters using rifles or the like. To operate the present invention, a hunter places or throws the receiver apparatus up to a distance of 70 yards away, and he then enters his stand or desired place of hunting with the transmitter apparatus. When a game animal approaches and is in the area of interest, the transmitter apparatus is activated by the hunter through one of the four buttons. When one of these buttons is pressed, a signal is generated that allows the receiver apparatus to transmit an audible sound to distract this animal. The pitch of the audible sound transmitted by the receiver apparatus can be indicative of a wild game animal in the area being hunted. For example, one sound transmitted can be of a pitch that simulates the sound of a chirping squirrel. Another sound transmitted can be of a pitch that simulates the sound of a bird native to the particular area being hunted. Similarly, other sounds indicative of the environment of an area being hunted can also be preset for use when the present invention is built. The sounds generated by the present invention thus distract a stalked animal such that the hunter can draw his weapon for firing. The spherical structure of the receiver apparatus allows the hunter to enter his stand and throw the receiver apparatus away from him in a desired direction. This prevents a hunter's odor from contaminating an area to be hunted or from leaving a trail between a hunter's position and the receiver apparatus if he were to emplace the receiver apparatus at a location manually. The reflective strip on the receiver apparatus allows it to be readily found when visibility is limited or when dark. In addition, the casing of the receiver apparatus may also be formed with a camouflage pattern to break up its outline when placed at a location for use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An electronic sound producing game animal distraction device used by a hunter for distracting a game animal being stalked and thus allowing the hunter to draw his weapon without being seen by the distracted animal comprising, in combination:

a transmitter apparatus including:
      a hollow rigid plastic box-shaped housing having a top wall, a bottom wall, and a periphery interconnecting the top wall and the bottom wall formed of a pair of opposed long side walls and a pair of short side walls,
      a first pair of flexible straps and a second pair of flexible straps, the first pair of straps coupled to the bottom wall of the housing and extended outwards therefrom in opposite directions perpendicular to the long side walls, the second pair of flexible straps coupled to the bottom wall of the housing and extended outwards therefrom in opposite directions perpendicular to the short side walls and with one strap of the first pair having a pile-type fastener coupled thereto and one strap of the second pair having a pile-type fastener coupled thereto and with the other strap of the first pair having a complementary pile-type fastener coupled thereto and the other strap of the second pair having a complementary pile-type fastener coupled thereto, the fasteners of the first pair securable in a closed loop configuration and the fasteners of the second pair securable in another closed loop configuration for securing the housing about a bow handle or a stock of a rifle, and
      an electronic transmitter circuit disposed within the housing, the transmitter circuit including an oscillator means for generating a plurality of radio signals over a predetermined frequency range, amplification means coupled to the oscillator means for amplifying the generated radio signals, manually-actuated frequency selection means coupled to the amplifier means and extended through the top wall of the housing for allowing the hunter to choose one of four radio signals at a selected frequency or frequencies for use, antenna means coupled to the frequency selection means and extended from the housing for allowing propagation of the chosen radio signal into free space, a removable battery for supplying electrical energy for operation, and a power switch coupled between the battery and the transmitter circuit and extended through the housing and with the power switch having one orientation for allowing supply of electrical energy from the battery to the transmitter circuit and another orientation for preventing such supply; and a receiver apparatus including:
      a rigid plastic spherical casing formed of two hemispheric sections of a blaze orange color coupled together to create a hollow interior and with the casing further having a strip of reflective material coupled thereto, and
      four electronic receiver circuits disposed within the casing and with the casing and receiver circuits therein positionable at a location remote from the transmitter, each receiver circuit further including antenna means extended through a separate bore formed on the casing and tuned for receiving one of the four radio signals transmitted from the transmitter apparatus, amplifier means coupled to the antenna for amplifying the received radio signal, speaker means coupled to the amplifier means and extended through a separate port on the casing and for producing an audible sound with a pitch indicative of the frequency or frequencies of the received radio signal, a removable battery for supplying electrical energy for operation, and a power switch coupled between the battery and the receiver circuits and extended through the housing and with the power switch having one orientation for allowing supply of electrical power and another orientation for preventing such supply.

2. An electronic sound producing device used by a hunter comprising:

transmitter means for generating and transmitting into free space one of a plurality of radio signals and with the radio signal selectable by a hunter;

coupling means for securing the transmitter means to a bow handle or a stock of a rifle; and remotely positionable receiver means for receiving the selected radio frequency signal and producing an audible sound with a pitch indicative of such signal, wherein the receiver means is disposed within a rigid spherical casing.

3. The electronic sound producing device as set forth in claim 2 wherein the casing has a strip of reflective material coupled thereto.

* * * * *